US006374332B1

(12) United States Patent
Mackenthun et al.

(10) Patent No.: US 6,374,332 B1
(45) Date of Patent: Apr. 16, 2002

(54) CACHE CONTROL SYSTEM FOR PERFORMING MULTIPLE OUTSTANDING OWNERSHIP REQUESTS

(75) Inventors: Donald W. Mackenthun, Fridley; Kelvin S. Vartti, Hugo, both of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/409,756

(22) Filed: Sep. 30, 1999

(51) Int. Cl.$^7$ ............................................. G06F 13/00
(52) U.S. Cl. ....................... 711/145; 711/150; 711/151
(58) Field of Search .................................. 711/145, 147, 711/150, 151, 156, 141

(56) References Cited

U.S. PATENT DOCUMENTS

| | | | | |
|---|---|---|---|---|
| 4,755,930 A | * | 7/1988 | Wilson, Jr. et al. | 364/200 |
| 4,843,542 A | * | 6/1989 | Dashiell et al. | 364/200 |
| 5,025,365 A | * | 6/1991 | Mathur et al. | 364/200 |
| 5,297,269 A | * | 3/1994 | Donaldson et al. | 395/425 |
| 5,423,016 A | * | 6/1995 | Tsuchiya et al. | 395/425 |
| 6,014,709 A | * | 1/2000 | Gulick et al. | 709/235 |
| 6,052,760 A | * | 4/2000 | Bauman et al. | 711/119 |
| 6,167,489 A | * | 12/2000 | Bauman et al. | 711/145 |
| 6,178,466 B1 | * | 1/2001 | Gilbertson et al. | 710/3 |
| 6,226,716 B1 | * | 5/2001 | Bauman et al. | 711/145 |
| 6,295,553 B1 | * | 9/2001 | Gilbertson et al. | 709/207 |
| 6,314,491 B1 | * | 11/2001 | Freerksen et al. | 711/124 |

* cited by examiner

Primary Examiner—Matthew M. Kim
Assistant Examiner—Stephen Elmore
(74) Attorney, Agent, or Firm—Beth L. McMahon; Michael B. Atlass; Charles A. Johnson

(57) ABSTRACT

An improved directory-based, hierarchical memory system is disclosed that is capable of simultaneously processing multiple ownership requests initiated by a processor that is coupled to the memory. An ownership request is initiated on behalf of a processor to obtain an exclusive copy of memory data that may then be modified by the processor. In the data processing system of the preferred embodiment, multiple processors are each coupled to a respective cache memory. These cache memories are further coupled to a hierarchical memory structure including a main memory and one or more additional intermediate levels of cache memory. As is known in the art, copies of addressable portions of the main memory may reside in one or more of the cache memories within the hierarchical memory system. A memory directory records the location and status of each addressable portion of memory so that coherency may be maintained. Prior to updating an addressable portion of memory in a respectively coupled cache, a processor must acquire an exclusively "owned" copy of the requested memory portion from the hierarchical memory. This is accomplished by issuing a request for ownership to the hierarchical memory. Return of ownership may impose memory latency for write requests. To reduce this latency, the current invention allows multiple requests for ownership to be initiated by a processor simultaneously. In the preferred embodiment, write request logic receives two pending write requests from a processor. For each request that is associated with an addressable memory location that is not yet owned by the processor, an associated ownership request is issued to the hierarchical memory. The requests are not processed in the respective cache memory until after the associated ownership grant is returned from the hierarchical memory system. Because ownership is not necessarily granted by the hierarchical memory in the order ownership requests are issued, control logic is provided to ensure that a local cache processes all write requests in time-order so that memory consistency is maintained. According to another aspect of the invention, read request logic is provided to allow a memory read request to by-pass all pending write requests previously issued by the same processor. In this manner, read operations are not affected by delays associated with ownership requests.

20 Claims, 7 Drawing Sheets

PROCESSING MODULE (POD)

SUB-PROCESSING MODULE (SUB-POD)

CACHE CONTROL SYSTEM FOR PERFORMING MULTIPLE OUTSTANDING OWNERSHIP REQUESTS

Cross-Reference to Other Applications and Issued Patent

The following co-pending applications of common assignee contain some common disclosure:

"A Directory-Based Cache Coherency System", filed Nov. 5, 1997, Ser. No. 08/965,004, incorporated herein by reference in its entirety;

"Message Flow Protocol for Avoiding Deadlocks", U.S. Pat. No. 6,014,709, issued Jan. 11, 2001, incorporated herein by reference in its entirety;

"High-Speed Memory Storage Unit for a Multiprocessor System Having Integrated Directory and Data Storage Subsystems", filed Dec. 31, 1997, Ser. No. 09/001,588, incorporated herein by reference in its entirety; and "Directory-Based Cache Coherency System Supporting Multiple Instruction Processor and Input/Output Caches", filed Dec. 31, 1997, Ser. No. 09/001,598, incorporated herein by reference in its entirety; and "Directory-Based Cache Coherency System Supporting Multiple Instruction Processor and Input/Output Caches", a Divisional of Ser. No. 091001,598, filed Aug. 24, 2000, Ser. No. 09/645,233, incorporated herein by reference in its entirety.

BACKGROUND OF THE INVENTION

1. Field of the Invention

This invention relates generally to an improved system and method for maintaining cache coherency in a data processing system in which multiple processors are coupled to a directory-based, hierarchical shared memory; and more particularly, relates to a system that allows one or more of the processors to each have multiple ownership requests simultaneously pending to the shared memory, wherein each of the ownership requests is a request to gain exclusive access to a requested, addressable portion of the memory.

2. Description of the Prior Art

Data processing systems are becoming increasing complex. Some systems, such as Symmetric Multi-Processor (SMP) computer systems, couple two or more Instruction Processors (IPs) and multiple Input/Output (I/O) Modules to shared memory. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high speed cache memory systems are often coupled to one or more of the IPs for storing data signals that are copied from main memory. These cache memories are generally capable of processing requests faster than the main memory while also serving to reduce the number of requests that the main memory must handle. This increases system throughput.

While the use of cache memories increases system throughput, it causes other design challenges. When multiple cache memories are coupled to a single main memory for the purpose of temporarily storing data signals, some system must be utilized to ensure that all IPs and I/O Modules are working from the same (most recent) copy of the data. For example, if a copy of a data item is stored, and subsequently modified, in a cache memory, another IP requesting access to the same data item must be prevented from using the older copy of the data item stored either in main memory or the requesting IP's cache. This is referred to as maintaining cache coherency. Maintaining cache coherency becomes more difficult as more caches are added to the system since more copies of a single data item may have to be tracked.

Many methods exist to maintain cache coherency. Some earlier systems achieve coherency by implementing memory locks. That is, if an updated copy of data exists within a local cache, other processors are prohibited from obtaining a copy of the data from main memory until the updated copy is returned to main memory, thereby releasing the lock. For complex systems, the additional hardware and/or operating time required for setting and releasing the locks within main memory cannot be justified. Furthermore, reliance on such locks directly prohibits certain types of applications such as parallel processing.

Another method of maintaining cache coherency is shown in U.S. Pat. No. 4,843,542 issued to Dashiell et al., and in U.S. Pat. No. 4,755,930 issued to Wilson, Jr. et al. These patents discuss a system wherein each processor has a local cache coupled to a shared memory through a common memory bus. Each processor is responsible for monitoring, or "snooping", the common bus to maintain currency of its own cache data. These snooping protocols increase processor overhead, and are unworkable in hierarchical memory configurations that do not have a common bus structure. A similar snooping protocol is shown in U.S. Pat. No. 5,025,365 to Mathur et al., which teaches local caches that monitor a system bus for the occurrence of memory accesses which would invalidate a local copy of data. The Mathur snooping protocol removes some of overhead associated with snooping by invalidating data within the local caches at times when data accesses are not occurring, however the Mathur system is still unworkable in memory systems without a common bus structure.

Another method of maintaining cache coherency is shown in U.S. Pat. No. 5,423,016 to Tsuchiya. The method described in this patent involves providing a memory structure called a "duplicate tag" with each cache memory. The duplicate tags record which data items are stored within the associated cache. When a data item is modified by a processor, an invalidation request is routed to all of the other duplicate tags in the system. The duplicate tags are searched for the address of the referenced data item. If found, the data item is marked as invalid in the other caches. Such an approach is impractical for distributed systems having many caches interconnected in a hierarchical fashion because the time required to route the invalidation requests poses an undue overhead.

For distributed systems having hierarchical memory structures, a directory-based coherency system becomes more practical. Directory-based coherency systems utilize a centralized directory to record the location and the status of data as it exists throughout the system. For example, the directory records which caches have a copy of the data, and further records if any of the caches have an updated copy of the data. When a cache makes a request to main memory for a data item, the central directory is consulted to determine where the most recent copy of that data item resides. Based on this information, the most recent copy of the data is retrieved so that it may be provided to the requesting cache. The central directory is then updated to reflect the new status for that unit of memory. A novel directory-based cache coherency system for use with multiple Instruction Processors coupled to a hierarchical cache structure is described in the co-pending application entitled "Directory-Based Cache Coherency System Supporting Multiple Instruction Processor and Input/Output Caches" referenced above and which is incorporated herein by reference in its entirety.

The use of the afore-mentioned directory-based cache coherency system provides an efficient mechanism for sharing data between multiple processors that are coupled to a distributed, hierarchical memory structure. Using such a system, the memory structure may be incrementally expanded to include any multiple levels of cache memory while still maintaining the coherency of the shared data. As the number of levels of hierarchy in the memory system is increased, however, some efficiency is lost when data requested by one cache memory in the system must be retrieved from another cache.

As an example of performance degradation associated with memory requests in a hierarchical cache memory system, consider a system having a main memory coupled to three hierarchical levels of cache memory. In the exemplary system, multiple third-level caches are coupled to the main memory, multiple second-level caches are coupled to each third-level cache, and at least one first-level cache is coupled to each second-level cache. This exemplary system includes a non-inclusive caching scheme. This means that all data stored in a first-level cache is not necessarily stored in the inter-connected secon-level cache, and all data stored in a second-level cache is not necessarily stored in the inter-connected third-level cache.

Within the above-described system, one or more processors are respectively coupled to make memory requests to an associated first-level cache. Requests for data items not resident in the first-level cache are forwarded on to the inter-coupled second-level, and in some cases, the third-level caches. If neither of the intercoupled second or third level caches stores the requested data, the request is forwarded to main memory.

Within the current exemplary system, assume a processor makes a request for data to the intercoupled first-level cache. The requested data is not stored in this first-level cache, but instead is stored in a different first-level cache within the system. If this request involves obtaining access to a read-only copy of the data, and the first-level cache that stores the data is storing a read-only copy, the request can be completed without involving the first-level cache that currently stores a copy of the data. That is, the request may be processed by one of the inter-connected second or third-level caches, or by the main memory, depending on which one or more of the memory structures has a copy of the data.

In addition to read requests, other types of requests may be made to obtain "exclusive" copies of data that can be updated by the requesting processor. In these situations, any previously cached copies of the data must be marked as invalid before the request can be granted to the requesting cache. That is, in these situations, copies of the data may not be shared among multiple caches. This is necessary so that there is only one "most-current" copy of the data existing in the system and no processor is working from outdated data. Returning to the current example, assume the request from the first-level cache is for an exclusive copy of data. This request must be passed via the cache hierarchy to the main memory. The main memory forwards this request back down the hierarchical memory structure to the first-level cache that stores the requested data. This first-level cache must invalidate its stored copy of the data, indicating that this copy may no longer be used. If necessary, modified data is passed back to the main memory to be stored in the main memory and to be forwarded on to the requesting first-level cache. In this manner, the requesting cache is provided with an exclusive copy of the most current data.

As may be seen from the current example, in a hierarchical memory system having multiple levels of cache that are not all interconnected by a common bus structure, obtaining an exclusive copy of data that can be utilized by a processor for update purposes may be time-consuming. As the number of these so-called "ownership" requests for obtaining an exclusively "owned" data throughput may decrease. This is especially true if additional levels of hierarchy are included in the memory structure. What is needed, therefore, is a system that minimizes the impact on processing throughput that is associated with making ownership requests within a hierarchical, directory-based memory system.

OBJECTS

The primary object of the invention is to provide an improved shared memory system for a multiprocessor data processing system;

A further object is to provide a hierarchical, directory-based shared memory system having improved response times;

A yet further object is to provide a memory system allowing multiple ownership requests to be pending to main memory from a single processor at once;

Yet another object is to provide a memory system that allows multiple ownership requests to be pending from all processors in the system simultaneously;

A still further object is to provide a memory system that allows an instruction processor to continue processing instructions while multiple ownership requests are pending to main memory;

Another object is to provide a memory system that allows multiple memory write requests that were issued by the same instruction processor to be processed simultaneously by the memory while additional write requests are queued for processing by the instruction processor;

A yet farther object is to provide a memory system allowing a subsequently-issued memory read request to by-pass all pending write requests that were issued by the same processor, and to thereby allow the read request to complete without being delayed by ownership requests to main memory; and Yet another object is to provide a memory system that ensures that multiple simultaneously-pending memory write requests from the same processor are processed in the time-order in which the requests were issued so that data coherency is maintained.

SUMMARY OF THE INVENTION

The objectives of the present invention are achieved in a memory system that allows a processor to have multiple ownership requests pending to memory simultaneously. The data processing system of the preferred embodiment includes multiple processors, each coupled to a respective cache memory. These cache memories are further coupled to a main memory through one or more additional intermediate levels of cache memory. As is known in the art, copies of main memory data may reside in one or more of the cache memories within the hierarchical memory system. The main memory includes a directory to record the location and status of the most recent copy of each addressable portion of memory.

A processor makes memory requests to its respectively-coupled cache memory. In the case of write requests, the respectively coupled cache memory must verify that ownership has already been obtained for the requested addressable portion of memory. If ownership has not been obtained, the cache memory must make an ownership request via the intermediate levels of cache memory. This request will be forwarded to main memory, if necessary, which, in turn, may be required to complete the request by invalidating a copy of the data located in another cache memory. Request processing may also require that an updated data copy be obtained from the other cache memory and forwarded to the requesting cache.

The current invention allows multiple requests for ownership to be pending from a processors respectively-coupled cache memory simultaneously. In the preferred embodiment, first request logic associated with the respectively-coupled cache memory receives a first write request from the processor. The first write request will be staged to second write request logic if another write request is not already being processed by the respectively-coupled cache. After the first request is staged, another write request may be provided to the first request logic for processing.

After being staged to the second write request logic, a determination is made as to whether ownership is available for the addressable memory portion requested by the first write request. If ownership is not available, an ownership request is made for the requested memory portion via the intermediate cache structure. While this request is being issued, a second determination is made regarding the availability of ownership for the second write request. A second ownership request is generated if ownership is again unavailable for the requested memory portion.

Eventually, ownership and any updated data associated with the first request will be provided to the requesting cache by main memory, or alternatively, by another cache memory. The first write request may then be completed to the requesting cache. After the completion of the first request, ownership for the second request is, in most cases, already available because of the concurrent request processing for the first and second ownership requests. The second write request is staged to the second write request logic and completed without delay. Thus, the time required to process the second request is, in most instances, "buried" by the processing of the first request, thereby reducing the processing time for the two requests by almost fifty percent.

In the system of the preferred embodiment, ownership grants are not necessarily provided in the order in which ownership requests are made. Therefore, in the above example, ownership for the second request may become available prior to that for the first request. The current invention includes control logic to ensure that requests are processed in the order issued by the respective instruction processor, regardless of the order in which ownership is granted. This is necessary to ensure newer data is not erroneously overwritten by an older request.

According to another aspect of the invention, a write request buffer coupled to the respective cache memory is provided to receive additional pending write requests issued by the processor. The processor may continue issuing write requests until the write request buffer is full. The pending requests are processed in the order they are issued. Therefore, after the cache completes processing of the older of two simultaneously-pending write requests in the above-described manner, a predetermined one of the requests stored in the write request buffer is removed from the buffer and provided to the first write request logic to be processed by the cache.

The current invention further provides read request processing logic coupled to the respectively-coupled cache. A read request issued by the processor is received by the read request logic, and is processed, in most cases, before processing completes for any of the multiple pending write requests. An exception to this rule exists for a read request that requests access to the same addressable portion of memory as was requested by a previously-issued write request. In this case, the processing of the read request must be delayed until the previously-issued write operation is completed. The expedited handling of read requests is performed because, in the system of the preferred embodiment, an instruction processor can not continue execution until a pending read request to memory has been completed. In contrast, outstanding write requests do not cause the processor to "stall" in this manner, and processor execution may continue even if multiple outstanding write requests are pending to memory.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

System Platform

Figure 1:
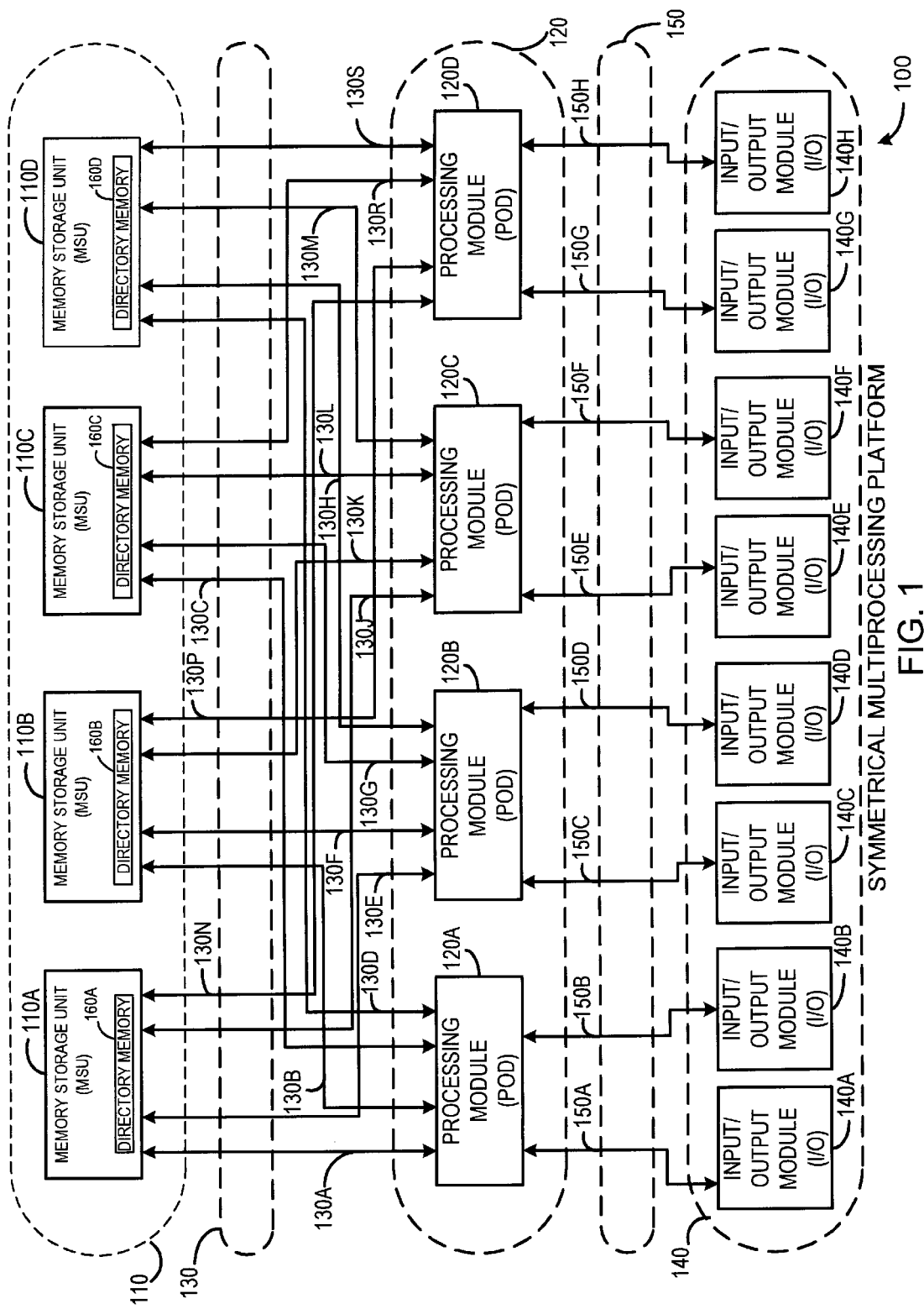
FIG. 1 is a block diagram of a Symmetrical MultiProcessor (SMP) system platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In one embodiment of the present invention, MI 130 comprises separate bidirectional data and bi-directional address/command interconnections, and further includes unidirectional control lines that control the operation on the data and address/command interconnections (not individually shown). The control lines run at system clock frequency (SYSCLK) while the data bus runs source synchronous at two times the system clock frequency (2×SYSCLK). In a preferred embodiment of the present invention, the system clock frequency is 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150 individually shown as 150A through 150H. For example, I/O Module 140A is connected to POD 120A via a dedicated point-to-point MIO Interface 150A. The MIO Interfaces 150 are similar to the MI Interfaces 130, but in the preferred embodiment have a transfer rate that is approximately half the transfer rate of the MI Interfaces because the I/O Modules 140 are located at a greater distance from the PODs 120 than are the MSUs 110. The I/O Modules 140 will be discussed further below.

Processing Module (POD)

Figure 2:
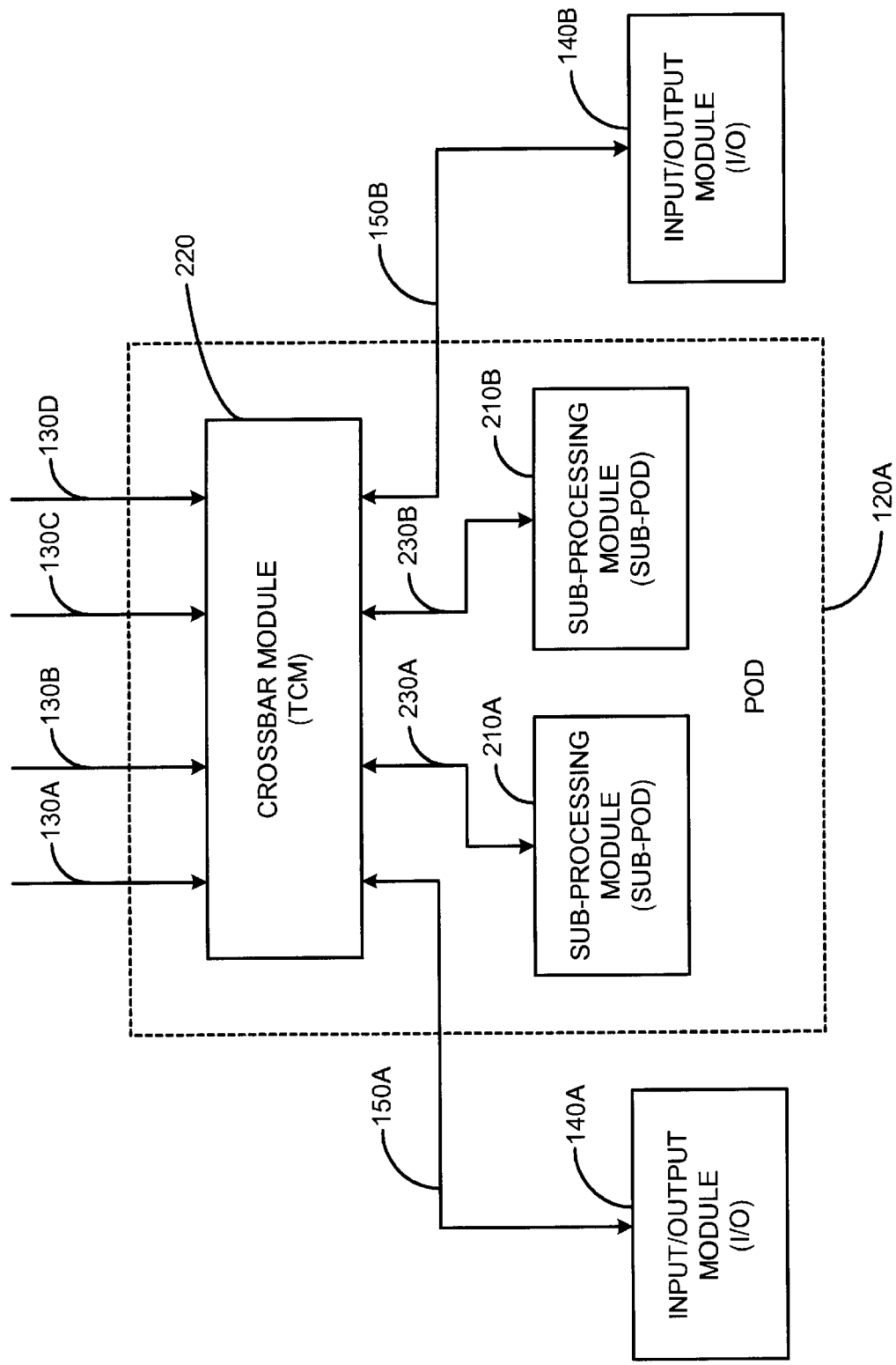
FIG. 2 is a block diagram of a Processing Module (POD) according to one embodiment of the present invention.

FIG. 2 is a block diagram of a processing module (POD) according to one embodiment of the present invention. POD 120A is shown, but each of the PODs 120A through 120D have a similar configuration. POD 120A includes two Sub-Processing Modules (Sub-PODs) 210A and 210B. Each of the Sub-PODs 210A and 210B are interconnected to a Crossbar Module (TCM) 220 through dedicated point-to-point Interfaces 230A and 230B, respectively, that are similar to the MI interconnections 130. TCM 220 further interconnects to one or more I/O Modules 140 via the respective poin-to-point MIO Interfaces 150. TCM 220 both buffers data and functions as a switch between Interfaces 230A, 230B, 150A, and 150B, and MI Interfaces 130A through 130D. When an I/O Module 140 or a Sub-POD 210 is interconnected to one of the MSUs via the TCM 220, the MSU connection is determined by the address provided by the I/O Module or the Sub-POD, respectively. In general, the TCM maps one-fourth of the memory address space to each of the MSUs 110A–110D. According to one embodiment of the current system platform, the TCM 220 can further be configured to perform address interleaving functions to the various MSUs. The TCM may also be utilized to perform address translation functions that are necessary for ensuring that each processor (not shown in FIG. 2) within each of the Sub-PODs 210 and each I/O Module 140 views memory as existing within a contiguous address space as is required by certain off-the-shelf operating systems.

In one embodiment of the present invention, I/O Modules 140 are external to Sub-POD 210 as shown in FIG. 2. This embodiment allows system platform 100 to be configured based on the number of I/O devices used in a particular application. In another embodiment of the present invention, one or more I/O Modules 140 are incorporated into Sub-POD 210. I/O Modules 140 are discussed in further detail below.

Sub-Processing Module

Figure 3:
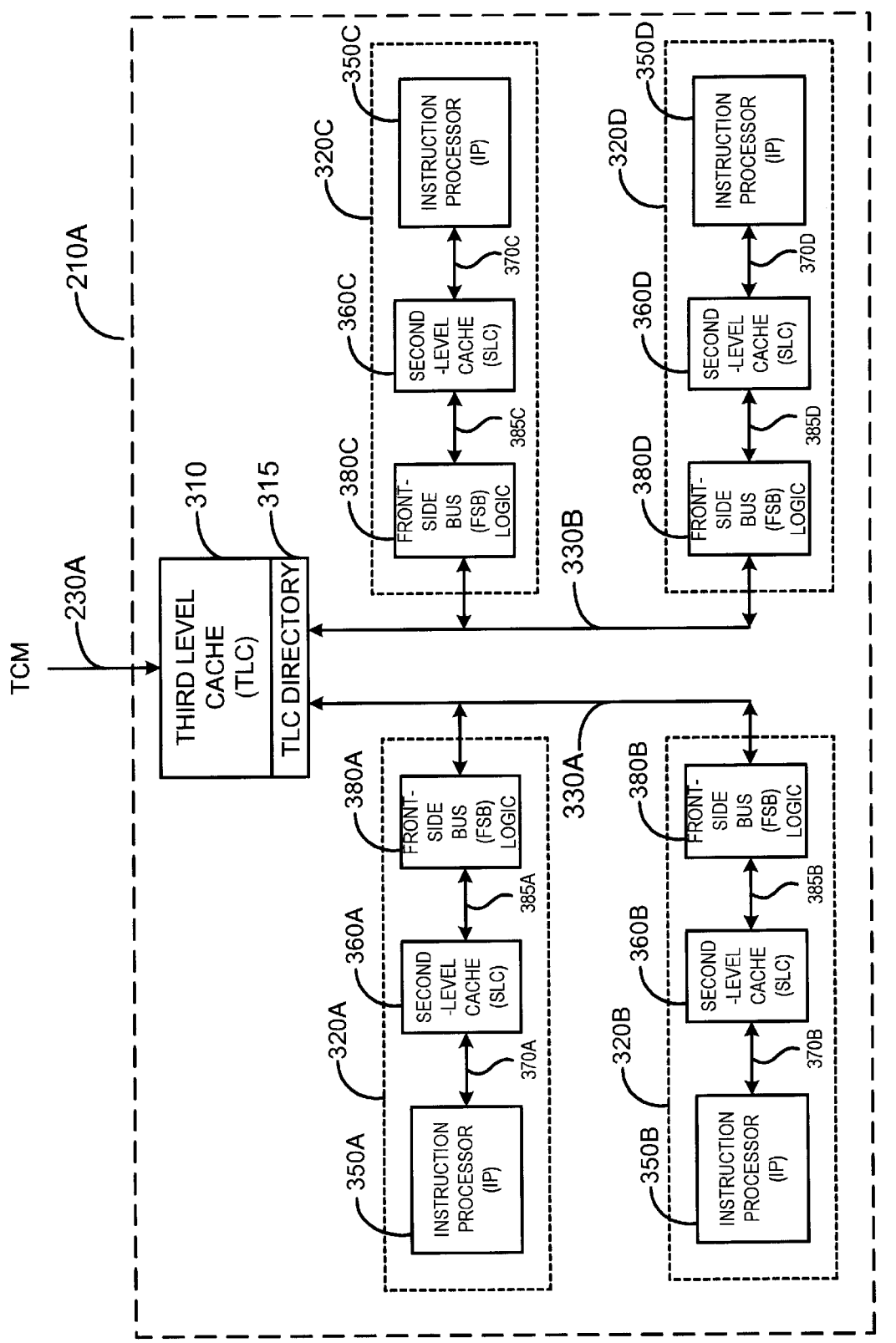
FIG. 3 is a block diagram of a Sub-Processing Module (Sub-POD) according to one embodiment of the present invention.

FIG. 3 is a block diagram of a Sub-Processing Module (Sub-POD) according to one embodiment of the present invention. Sub-POD 210A is shown, but it is understood that all Sub-PODs 210 have similar structures and interconnections. In this embodiment, Sub-POD 210A includes a Third-Level Cache (TLC) 310 and one or more Coherency Domains 320 (shown as Coherency domains 320A, 320B, 320C, and 320D). TLC 310 is connected to Coherency Domains 320A and 320B via Bus 330A, and is connected to Coherency Domains 320C and 320D via Bus 330B. TLC 310 caches data from the MSU, and maintains data coherency among all of Coherency Domains 320, guaranteeing that each processor is always operating on the latest copy of the data.

Each Coherency Domain 320 includes an Instruction Processor (IP) 350 (shown as IPs 350A, 350B, 350C, and 350D). Each of the IPs includes a respective First-Level Cache (not shown in FIG. 3.) Each of the IPs is coupled to a Second-Level Cache (SLC) 360 (shown as SLC 360A, 360B, 360C and 360D) via a respective point-to-point Interface 370 (shown as Interfaces 370A, 370B, 370C, and 370D). Each SLC further interfaces to Front-Side Bus (FSB) Logic 380 (shown as FSB Logic 380A, 380B, 380C, and 380D) via a respective one of Interfaces 385A, 385B, 385C, and 385D. FSB Logic is also coupled to a respective one of Buses 330A or 330B.

In the preferred embodiment, the SLCs 360 operate at a different clock speed than Buses 330A and 330B. Moreover, the request and response protocols used by the SLCs 360 are not the same as those employed by Buses 330A and 330B. Therefore, FSB logic is needed to translate the SLC requests into a format and clock speed that is compatible with that used by Buses 330.

Directory-Based Data Coherency Scheme of the System Architecture

Before discussing the Instruction Processor and Second-Level Cache in more detail, the data coherency scheme of the current system is discussed. Data coherency involves ensuring that each POD 120 operates on the latest copy of the data, wherein the term "data" in the context of the current Application refers to both processor instructions,. and any other types of information such as operands stored within memory. Since multiple copies of the same data may exist within platform memory, including the copy in the MSU and additional copies in various local cache memories (local copies), some scheme is needed to control which data copy is considered the "latest" copy.

The platform of the current invention uses a directory protocol to maintain data coherency. In a directory protocol, information associated with the status of units of data is stored in memory. This information is monitored and updated by a controller when a unit of data is requested by one of the PODs 120. In the preferred embodiment of the present invention, directory information is recorded in a directory memory in each of the MSUs. These are shown as Directory Memories 160A, 160B, 160C, and 160D of FIG. 1. Directory information is recorded in each of the Directory Memories for each 64-byte segment of data in the respective MSU 110, wherein such a segment is referred to as a cache line. The status of each cache line is updated when access to the cache line is granted to one of the Sub-PODs 210. The status information includes a vector which indicates which of the Sub-PODs have a local copy of the cache line.

In the present invention, the status of the cache line includes "shared" and "exclusive." Shared status means that one or more Sub-PODs have a local copy of the cache line for read-only purposes. A Sub-POD having shared access to a cache line may not update the cache line. Thus, for example, Sub-PODs 210A and 210B may have shared access to a cache line such that a copy of the cache line exists in the Third-Level Caches 310 of both Sub-PODs for read-only purposes.

In contrast to shared status, exclusive status, which is also referred to as exclusive ownership, indicates that only one Sub-POD "owns" the cache line. A Sub-POD must gain exclusive ownership of a cache line before data within the cache line may be modified. When a Sub-POD has exclusive ownership of a cache line, no other Sub-POD may have a copy of that cache line in any of its associated caches.

Before a Sub-POD can gain exclusive ownership of a cache line, any other Sub-PODs having copies of that cache line must complete any in-progress operations to that cache line. Then, if one or more Sub-POD(s) have shared access to the cache line, the Sub-POD(s) must designate their local copies of the cache line as invalid. This is known as a Purge operation. If, on the other hand, a single Sub-POD has exclusive ownership of the requested cache line, and the local copy has been modified, the local copy must be returned to the MSU before the new Sub-POD can gain exclusive ownership of the cache line. This is known as a "Return" operation, since the previous exclusive owner returns the cache line to the MSU so it can be provided to the requesting Sub-POD, which becomes the new exclusive owner. In addition, the updated cache line is written to the MSU sometime after the Return operation has been performed, and the directory state information is updated to reflect the new status of the cache line data. In the case of either a Purge or Return operation, the Sub-POD(s) having previous access rights to the data may no longer use the old local copy of the cache line, which is invalid. These Sub-POD(s) may only access the cache line after regaining access rights in the manner discussed above.

In addition to Return operations, Sub-PODs also provide data to be written back to an MSU during Flush operations. When a Sub-POD receives a cache line from an MSU, and the cache line is to be copied to a cache that is already fill, space must be allocated in the cache for the new data. Therefore, a predetermined algorithm is used to determine which older cache line(s) will be disposed of, or "aged out of" cache to provide the amount of space needed for the new information. If the older data has never been modified, it may be merely overwritten with the new data. However, if the older data has been modified, the cache line including this older data must be written back to the MSU 110 during a Flush Operation so that this latest copy of the data is preserved.

Data is also written to an MSU 110 during I/O Overwrite operations. An I/O Overwrite occurs when one of the I/O Modules 140 issues an I/O Overwrite command to the MSU. This causes data provided by the I/O Module to overwrite the addressed data in the MSU. The Overwrite operation is performed regardless of which other Sub-PODs have local copies of the data when the Overwrite operation is performed. The directory state information is updated to indicate that the affected cache line(s) is "Present" in the MSU, meaning the MSU has ownership of the cache line and no valid copies of the cache line exist anywhere else in the system.

In addition to having ownership following an I/O Overwrite operation, the MSU is also said to have ownership of a cache line when the MSU has the most current copy of the data and no other agents have a valid local copy of the data. This could occur, for example, after a Sub-POD having exclusive data ownership performs a Flush operation of one or more cache lines so that the MSU thereafter has the only valid copy of the data.

Coherency Scheme within a Sub-POD

As discussed above, in the system of the preferred embodiment, directory information is recorded in a directory memory in the MSU that indicates which of the Sub-POD(s) has a particular cache line. The MSU directory does not, however, indicate which of the cache memories within a Sub-POD has a copy of the cache line. For example, within a Sub-POD, a given cache line may reside within the TLC 310, one or more SLCs 360, and/or one or more First-Level Caches of a Sub-POD IP. Information pertaining to the specific cached data copies is stored in a directory memory within the TLC.

In a manner similar to that described above with respect to the MSU, the TLC stores status information about each cache line in TLC Directory 315 of FIG. 3. This status information indicates whether the TLC was granted either exclusive ownership or a read copy of a particular cache line by the MSU 110. The status information also indicates whether the TLC has, in turn, granted access to one or more SLCs in the respective Sub-POD. If the TLC has exclusive ownership, the TLC may grant exclusive ownership to one of the SLCs 360 in a Sub-POD 120 so that the IP 350 coupled to the SLC may update the cache line. Alternatively, a TLC having exclusive ownership of a cache line may also grant a read copy of the cache line to multiple ones of the SLCs in a Sub-POD. If the TLC only has a read copy of a cache line, the TLC may grant a read copy to one or more of the SLCs 360 in a POD 120 such that the interconnected IP may read, but not write, the cache line. In this case, the TLC may not grant any of the SLCs write access to the cache line.

The TLC tracks the copies that exist within a POD by recording an indicator identifying one or both of the Buses 330 to which it is coupled. For example, if TLC 310 granted exclusive ownership of a cache line to SLC 360A, the indicator stored in the TLC directory for that cache line identifies Bus 330A as having exclusive ownership. If TLC 310 granted read copies to both SLCs 360A and 360C, the TLC directory identifies both Buses 330A and 330B as having read copies. The manner in which this information is used will be discussed below.

When data is provided to an SLC 360, it may also be provided to the respective First-Level Cache (FLC) within the IP 350 coupled to that SLC. Generally, whenever an IP requests a read copy of data, the read copy will be provided by the SLC to be stored within the IP's FLC. An exception to this rule occurs for certain system-level clock information that will become outdated, and therefore is not forwarded to the FLC. In contrast to read data, a cache line that is obtained by the SLC from the TLC on an exclusive ownership basis is not generally forwarded to the FLC for storage. An exception to this rule occurs for certain resources that are associated with software locks, and which must be cached within the FLC until the IP releases the lock. The SLC includes Tag RAM Logic (not shown in FIG. 3) to record whether the associated FLC stores a copy of a particular cache line. This will be discussed further below.

As discussed above, the directory status information stored within the MSU 110 is used to maintain data coherency throughout the entire system. In a similar manner, the directory status information within the TLC is used to maintain data coherency within the respective Sub-POD 210. Within the Sub-POD, data coherency is maintained for each of the Buses 330, and is also maintained for the Sub-POD as a whole.

Data coherency is maintained for each of the Buses 330 using a snooping mechanism. If an IP 350 makes a request for an address that is not present in either the respective FLC or SLC, the SLC initiates a request via the respective FSB Logic 380 to the associated Bus 330. The request will indicate the type of request (read or write), and will also indicate the request address. Each SLC monitors, or "snoops" the Bus 330 via its respective FSB logic for these types of requests from the other SLC. When such a request is detected, the SLC that detected the request checks its internal Tag RAM to determine whether it stores a modified copy of the requested data. If it does store a modified copy of the requested data, that data is provided on Bus 330 so that a copy can be made within the requesting SLC. Additionally, if the requesting SLC is requesting exclusive ownership of the data, the other (non-requesting) SLC must also mark its resident copy as invalid, since only one SLC may have write ownership at a given time. Furthermore, if the SLC detecting the request determines that its associated FLC also stores a copy of the cache line that is requested for exclusive ownership, that SLC must direct the FLC to invalidate its local copy.

If an SLC is requesting a cache line that has not been modified by the other SLC that resides on the same Bus 330, the TLC 310 will handle the request. In this case, the SLC presents the request to Bus 330, and because the associated SLC does not respond to the request in a pre-determined period of time with snoop results, the TLC handles the request.

The TLCs process requests from the SLCs in the associated Sub-POD by determining if that Sub-POD has been granted the type of access that is being requested, and if so, how the requested cache line may be obtained. For example, a TLC may not grant a request made by an SLC for exclusive ownership of a cache line if the TLC itself has not been granted exclusive ownership. If the TLC has been granted exclusive ownership, the TLC must further determine if the other (non-requesting) Bus 330 has, in turn, been granted exclusive ownership. If the other Bus 330 has exclusive ownership of the data, the TLC issues a request to that Bus to initiate return of the data. Because the SLCs are snooping the Bus, this request will be detected, and an SLC owning the data will return any modified copy of the data to the TLC. Additionally, any copies of the requested cache line will be marked as invalid. The TLC may then provide the data to the requesting SLC and update the directory information to indicate that the other Bus 330 now has the exclusive ownership.

A similar mechanism is used if the SLC is requesting read access. If the TLC has been granted read access by the MSU for the requested cache line, the data is provided to the requesting SLC and the directory information is updated to reflect that the associated Bus 330 has read access of the data. Both Buses may be granted read access to the cache line simultaneously.

In yet another scenario, the TLC may not have a copy of the requested cache line at all, or may not have the type of access that is requested. This could occur for a number of reasons. For example, A TLC may obtain a copy of a cache line from the MSU, provide it to one or more of the SLCs in its Sub-POD, then later age the cache line out of memory to make room for another cache line. This aging out of the cache line in the TLC may occur even though an SLC in the Sub-POD still retains a copy. This is allowed because the cache memories of the preferred embodiment are not inclusive caches. That is, each cache line residing within an SLC does not necessarily reside in the associated TLC 310. As a result of this non-inclusive cache configuration, a request by any of the SLCs in the Sub-POD for the cache line may result in a cache miss at the TLC even if the cache line is stored in another SLC. A cache miss could also occur because the requested cache line does not reside in the TLC or in any other one of the caches in the respective Sub-POD. In yet another instance, an SLC may be requesting exclusive ownership of a cache line, but the TLC has only been granted a read copy of a requested cache line. In any of these cases, the TLC must make a request via the TCM 220 to the respective MSU Interface (MI) 130 for the cache line.

After a TLC makes a request via the respective MI Interface for access to a cache line, the request is presented to MSU 110, and the directory logic within the MSU determines where the most current copy of the data resides. This is accomplished in the manner discussed above. If the MSU owns the most recent copy of the data, the data may be provided immediately to the requesting TLC with the requested permission as either a read copy or with exclusive ownership. Similarly, if only a read copy of the data is being requested, and the MSU has granted only read copies to other Sub-PODs 210, the MSU may immediately provide the additional read copy to the requesting TLC. However, if exclusive ownership is being requesting, and the MSU has already granted exclusive ownership to another TLC 310 in another Sub-POD, the MSU must initiate a Return operation so that the TLC currently owning the data returns any updated data. Additionally, if exclusive ownership is being requested, the MSU must initiate a request to any other Sub-POD having a copy of the cache line directing that Sub-POD to invalidate its copy. These MSU requests may take a substantial amount of time, especially if a large number of requests are already queued to use the MI 130 associated with Sub-PODs having current copies of the requested cache line.

From the above discussion, it is apparent that if a large number of requests are being processed across the MI Interfaces, the necessity to request exclusive ownership from the MSU may substantially increase the time required to perform a write operation. The current invention minimizes the time required to obtain exclusive ownership by prefetching ownership before a write request is actually being processed.

Description of the Ownership Prefetching System of the Current Invention

Figure 4:
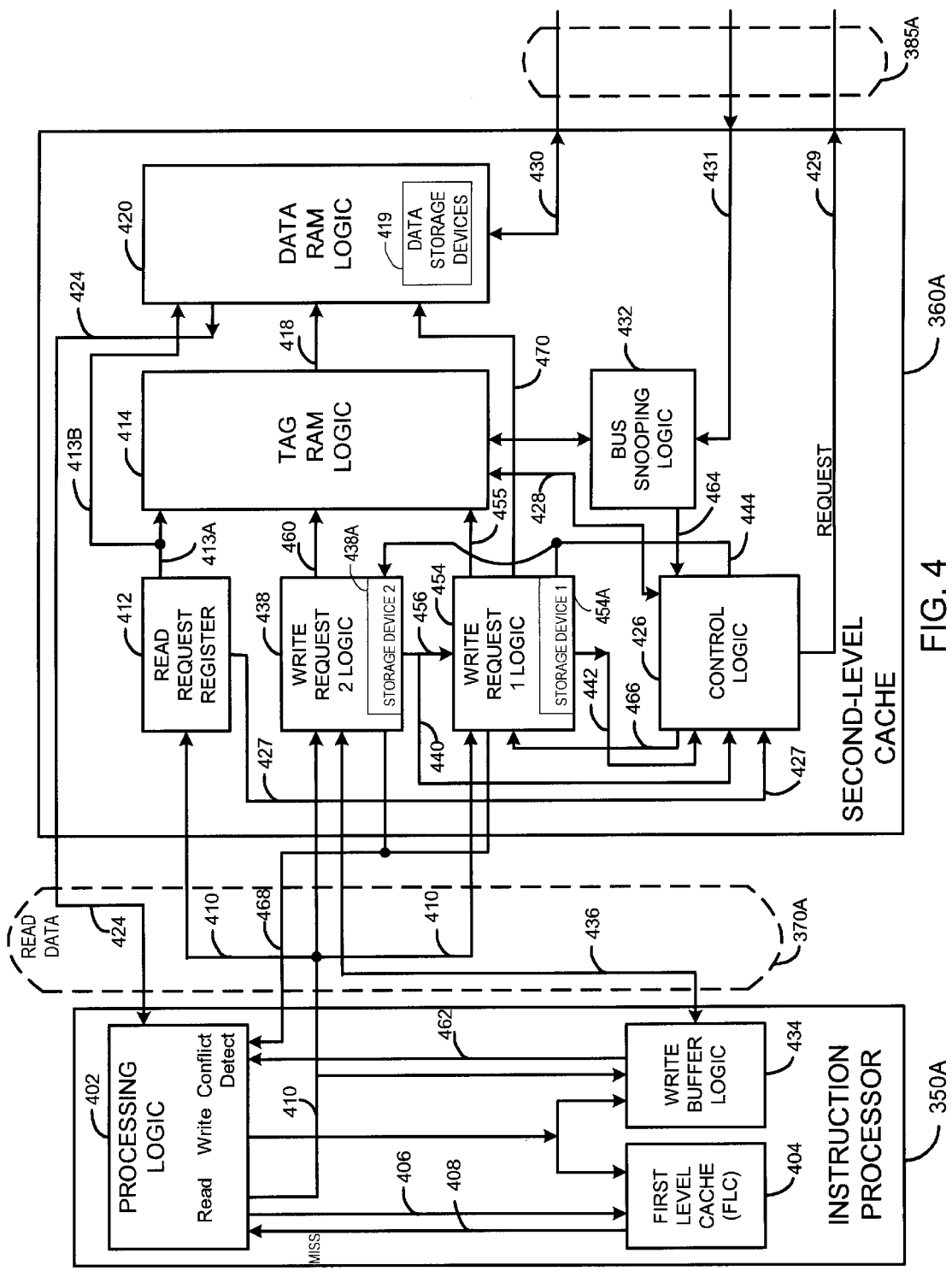
FIG. 4 is a block diagram of the Instruction Processor and Second Level Cache of the preferred embodiment.

FIG. 4 is a block diagram of the Instruction Processor 350A and Second Level Cache 360A of the preferred embodiment. Although the logic within Coherency Domain 320A is shown and described, it will be understood that the following description applied to all other coherency domains included in Data Processing System 100. Within the Instruction Processor, Processing Logic 402 executes instructions and processes operands retrieved from one of the cache memories included in Coherency Domain 320A, or from MSU 110. Processing Logic will attempt to first retrieve an instruction or operand from FLC 404 by making a request on Line 406. If the address is not located in FLC 404, a cache miss indication is provided to Processing Logic 402 on Line 408. As a result, Processing Logic will make a read request to SLC 360A on Line 410. The request is captured in Read Request Register 412, and is presented to the cache Tag RAM Logic 414 and to the Data RAM Logic 420 in parallel on Lines 413A and 413B, respectively.

In a manner known in the art, Tag RAM Logic 414 determines whether the requested address is resident within the SLC 360A. If it is, a hit signal is provided to Data RAM Logic on Interface 418 so that the requested cache line data that has already been read from Data Storage Devices 419 of Data RAM Logic 420 is gated onto Line 424 to be returned to Processing Logic 402. If the request address is not resident within the SLC 360A, a cache miss indication is provided to Control Logic 426 on Control Interface 428. In response, Control Logic receives the read request signals from Read Request Register 412 on Line 427, and forwards the read request on Line 429 to Interface 385A. In turn, FSB Logic 380A receives the request from Interface 385A, and reformats the request into the request format used by Bus 330A.

After the request is provided to Bus 330A, SLC 360B detects the request using logic similar to Bus Snooping Logic 432 shown for SLC 360A. The Bus Snooping Logic for SLC 360B receives the request signals from Interface 385B on an interface similar to that shown as Line 431 for SLC 360A. The SLC 360B Bus Snooping Logic reads state bits stored in its Tag RAM Logic to determine whether a cache line is resident within the SLC, and whether the cache line is available as a shared read-only copy or as an exclusively-owned copy. The state bits further record whether the copy has been modified, and whether the copy is still valid or whether it has been marked as invalid such that it may no longer be used.

In the current example, if the state bits in SLC 360B for the requested cache line indicate that the cache line is exclusively owned by SLC 360B, and has also been modified by SLC 360B, SLC 360B provides the updated copy on Line 430 to Interface 385B. SLC 360B will also invalidate its copy, and cause the associated FLC to invalidate its copy, if necessary. FSB Logic 380B receives and translates the data from the format used by the SLC to the format required by Bus 330A.

After FSB Logic 380B provides the re-formatted data to Bus 330A, FSB Logic 380A receives this data and translates it back to the data format used by the SLC. The data is provided on Line 430 of SLC 360A so that a read-only copy of the data may be stored in Data RAM Logic 420. In addition, control signals are provided on Line 431 to Bus Snooping Logic 432 of SLC 360A so that Bus Snooping Logic may update the Tag RAM Logic 414 to record read ownership.

TLC 310 also snoops Bus 330A, and detects that SLC 360B has provided the updated data to SLC 360A. Therefore, TLC does not respond to the request. The TLC updates its stored cache line data copy to reflect the modifications made by SLC 360B, and also records that Bus 330A now has a copy of the data for read purposes only.

If SLC 360B did not have an updated copy of the data, TLC 310 handles the request. Assuming the TLC has gained access rights to the cache line from MSU 110 as determined by the TLC state bits, and the cache line is either not resident in any of the other SLCs in the Sub-POD 210A, has only been provided to the TLC as a read copy, or is exclusively owned by the TLC and no other SLC in the Sub-POD has been granted exclusive ownership, the data may be provided to SLC 360A on Bus 330A upon receipt of the request. Otherwise, if TLC has been granted exclusive ownership to the cache line by MSU 110, and one of the SLCs 360C or 360D has an exclusive copy, the TLC must initiate a request on Bus 330B so that the SLC owning the data will return any data updates and the exclusive ownership to the TLC 310. As noted above, this is referred to as a "Return" operation. The SLC having the data will detect this request using associated Bus Snooping Logic such as that shown as Bus Snooping Logic 432 for SLC 360A. In response, the SLC will return the data on Bus 330B to TLC, which will in turn forward that data to the requesting SLC 360A. TLC 310 will update the cache line data to reflect any modifications made by the previous owner, and will also update its state bits to record the new status and location of the data copy as being a read copy that was made available to Bus 330A.

If the TLC does not have a copy of the requested cache line, the TLC makes a request across MI Interface 130 to the MSU 110. If the MSU owns that data, the data may be returned to the TLC 310 upon receipt of the request by the MSU. Likewise, if only read copies have been provided to one or more other TLCs, the MSU may provide the requested cache line to TLC 310. However, if one of the other TLCs has been granted exclusive ownership of the requested cache line, MSU 110 must send a request to the other TLC directing that TLC to invalidate its copy and return ownership to the MSU. In response, the TLC will use its state bits to determine if any of the SLCs in its associated Sub-POD 210 has been granted exclusive ownership of the data. The TLC will direct the SLC to return any modified copy of the data to the TLC, and to mark any copy of the cache line resident in either a FLC or SLC as invalid so that it can no longer be used. The TLC will likewise mark its copy as invalid, and any cache line updates will be forwarded on the associated MI Interface 130 to MSU 110. This data may then finally be provided as a read copy to the requesting TLC 310.

When the TLC receives the requested data, the TLC will make an entry in its directory memory for the cache line, then provide the data to Coherency Domain 320A via Bus 330A. The data is forwarded to SLC 360 via FSB Logic 380A, Interface 385A, and Line 430. The data is written to Data RAM Logic 420, and is also provided on Line 424 to Processing Logic 402 of IP 350A.

It may be noted that the return of the requested data to the Processing Logic 402 may require a delay, since the data may have to be returned from another Sub-POD 210. During this time, the Processing Logic is stalled waiting for the read data. This "stalling" of the IP during read requests involving data not available within a cache memory will be discussed in more detail below.

To prevent IP "stalls" from occurring during write requests, an ownership prefetch mechanism is implemented which minimizes the delay in obtaining ownership of a cache line that is not present within an IP's SLC. When the Processing Logic 402 is writing a modified operand to memory, the requested write address is presented to the FLC 404. If a cache hit occurs, the write operation occurs to the FLC. Regardless of whether a cache hit occurs to the FLC 404, the updated data will also be written to SLC.

Before the modified data is presented to the SLC, it is temporarily stored in Write Buffer Logic 434. Write Buffer Logic is capable of storing up to eight write requests at once. The data stored within the Write Buffer Logic need not be written to the SLC immediately. That is, generally the Processing Logic 402 may continue executing instructions even though the write data has not been written to the SLC. Processing Logic 402 is only required to wait for the completion of a write operation within the SLC in those situations in which a read operation is requesting access to the same addressable memory location as a pending write request. To detect this situation, the read request on Line 410 is provided to Write Buffer Logic 434, Write Request 2 Logic 438, and Write Request 1 Logic 454 to be compared against all pending write addresses. The conflict is indicated using signals on Lines 462 and 468, respectively. If a conflict is detected, the Processing Logic 402 must wait for the write operation to the SLC to complete so that the IP is guaranteed to receive updated data.

As stated above, the requests stored in the Write Buffer Logic need not be completed immediately since the Processing Logic 402 does not stall waiting for the write data to be written back to the SLC. Additionally, read operations performed after a write request is added to Write Buffer Logic 434 may by-pass the write operation using Read Request Register 412, and may be completed before the write operation is presented to the SLC. The expedited processing of read requests is performed to minimize the IP stalls that occur while the SLC 360A is waiting for the return of exclusive ownership of a cache line.

When a request is removed from Write Buffer Logic 434, it is written on Line 436 to a storage device included within Write Request 2 Logic 438 shown as Storage Device 2 438A. A designated signal included in the write request indicates that a valid request is now present in Write Request 2 Logic. Control Logic 426 receives this valid write request on Interface 440. Control Logic also receives signals on Line 442 from a request staging register included within Write Request 1 Logic 454. This staging register is shown as Storage Device 1 454A. If Control Logic determines that a valid request is present in Storage Device 2 438A, but is not present within Storage Device 1 454A, Control Logic provides an enable signal on Line 444 to Write Request 2 Logic and Write Request 1 Logic. This enable signal allows the request to be staged on Line 456 from Storage Device 2 438A to Storage Device 1 454A. At the same time, Write Request 2 Logic provides an acknowledge signal on the interface shown as Line 436 to Write Buffer Logic 434 to indicate that a second write request may be removed from Write Buffer Logic 434 and sent to Write Request 2 Logic 438.

The write request stored in Write Request 1 Logic 454 is presented to the Tag RAM Logic 414 and Data RAM Logic 420. The Tag RAM Logic determines whether the requested address is resident in Data RAM Logic 420. If it is, Tag RAM Logic 414 provides a signal on Line 418 indicating the initiated write operation may be completed to the Data RAM Logic. Tag RAM Logic also updates its state bits to indicate that the SLC stores a modified copy of the cache line. As discussed above, the state bits are used to determine when data needs to be provided on Line 430 to Interface 385A in response to Bus Snooping Logic 432 detecting a request for an updated cache line. If Tag RAM Logic indicates that the requested cache line is either not resident within Data RAM Logic 420, or is only available as a read copy, Tag RAM Logic indicates this status to Control Logic 426 on Interface 428. In a manner similar to that discussed above in reference to read request operation processing, Control Logic provides a request for ownership of the cache line on Line 429 to Interface 385A so that FSB Logic 380A receives and reformats the request into the format used by Bus 330A.

After the request is presented to Bus 330A, it is processed in the manner that is similar to that discussed above with respect to read requests. Namely, if TLC 310 has been granted exclusive ownership of the data by MSU 110, and no SLC has a copy of the data, TLC may provide the exclusive ownership to SLC 360A. If SLC 360B has been granted exclusive ownership of the requested cache line by TLC 310, and if SLC 3 60B has modified this cache line, the data will be provided by SLC 360B on Bus 330A to SLC 360A. This occurs because the Bus Snooping Logic within SLC 360B detects the request and further recognizes that a modified copy is stored in Data RAM Logic for SLC 360B. The copy in SLC 360B will be marked as invalid. Otherwise, if SLC 360B has an unmodified copy of the requested data, TLC 310 provides the copy of the data.

Alternatively, one of the SLCs 360C or 360D on Bus 330B may have exclusive ownership of the requested data. In this case, the data must be returned by the previous owner to TLC 310 so that it can be provided to SLC 360A. Additionally, the state bits within TLC 310 will be updated to reflect that Bus 330A, and not Bus 330B, now has exclusive ownership of the cache line. Finally, if only read copies have been provided by TLC 310 to one or more of the SLCs 360, the TLC must issue requests to the one or more of the Buses 330A and/or 330B having the read copies so that the SLCs 360 having these copies mark them as invalid. The exclusive ownership may then be provided to SLC 360A.

The above scenarios assume that TLC 310 has already gained exclusive ownership from MSU 110 for the requested cache line. If this is not the case, the TLC makes a request across MI Interface 130 to the MSU 110. If the MSU owns that data, the data may be returned upon receipt of the request to the TLC 310. If the MSU does not own the data and determines that other read copies have been provided to one or more other TLCs, the MSU must send a request to the other one or more TLCs directing that any copies in the associated one or more Sub-PODs 210 be invalidated. This invalidation process occurs in the manner discussed above. After the invalidation requests are issued by the MSU, the MSU may thereafter provide the requested cache line to the requesting TLC 310 and update its directory memory to reflect the new cache line status.

According to another scenario, the MSU may have granted exclusive ownership of the requested cache line to another one of the TLCs in one of the other Sub-PODs in the system. After using the state bits in the directory memory to determine which one of the TLCs owns the cache line, the MSU sends a request to that TLC directing it to invalidate the local copy and return ownership. In response, the TLC will use its state bits to determine if any of the SLCs in its associated Sub-POD 210 has been granted exclusive ownership or a read copy of the data. The TLC will request that any copy in the SLC and/or associated FLC be invalidated. Any updates to the cache line that are resident within an SLC must be returned to the TLC in the manner discussed above to be forwarded to the MSU. The MSU will grant ownership, and, if necessary, provide an updated copy of the cache line to TLC 310 in Sub-POD 210A. The MSU will also update its data copy and modify the state bits in its directory memory to reflect the exclusive ownership that has been granted to TLC 310 in Sub-POD 210A.

Once ownership for a cache line has been granted to TLC 310, the state bits for the cache line are updated within the TLC, and the TLC forwards the data on Bus 330A to the requesting SLC, which in this example is SLC 360A. This data is received by FSB Logic 380A, where it is translated into a format required by the SLC 360A. Then it is provided on Interface 385A and Line 430 to be written to Data RAM Logic 420. Additionally, control signals on Bus 330A are received by FSB Logic 380A, are translated into the SLC-required format, and are passed on Line 431 to Bus Snooping Logic 432. In response to these control signals indicating that ownership has been granted to SLC 360A, Bus Snooping Logic 432 provides a signal on Line 464 to Control Logic 426 indicating the received ownership. In response, Control Logic issues signals on Line 428 to update the status information stored in Tag RAM Logic to record the ownership, and to further record that the cache line is modified. Control Logic also issues a signal on Line 466 indicating that Write Request 1 Logic 454 may now provide the modified request data to Data RAM Logic 420 on the interface shown as Line 470. When the write operation is completed as indicated by an acknowledge provided by the Data RAM Logic on Line 470, Storage Device 1 is cleared and becomes available to receive another request.

The above description illustrates the possibly lengthy process associated with gaining exclusive ownership in a system employing a directory-based main memory and a hierarchical cache structure. To minimize the impact of the delay associated with gaining this exclusive ownership, the current invention provides a mechanism that allows multiple requests for ownership to be pending from the same IP at once.

Returning to FIG. 4 and the current example, it will be recalled that after a first request is staged from Write Request 2 Logic 438 to Write Request 1 Logic 454, an acknowledge signal is issued on Line 436 to Write Buffer Logic 434. If one or more of the write requests is pending in Write Buffer Logic, a predetermined one of the pending requests is retrieved and provided on Line 436 to Write Request 2 Logic 438 where it will be stored. In the preferred embodiment, the oldest pending request is selected as the predetermined one of the requests. It will be assumed for the current example that a valid request is still resident in Write Request 1 Logic 454 at the time the latter request is stored in Write Request 2 Logic. Control Logic 426 detects the valid request signals provided with each of the requests in Write Request 2 Logic and Write Request I Logic, and determines that the more recently-provided request may not be staged to Write Request 1 Logic. Instead, the latter request is maintained in Write Request 2 Logic, and is provided on the interface shown as Line 460 to Tag RAM Logic 414. Tag RAM Logic determines whether the SLC already has exclusive ownership of the requested cache line.

If Tag RAM Logic determines that a write request stored in Write Request 2 Logic 438 requests access to a cache line that is exclusively owned by SLC 360A, the request is ready to be processed by Data RAM Logic 420 since ownership need not be obtained. However, to maintain data consistency, write operations must be performed in the order in which they are issued. This prevents a previously-issued request from overwriting data provided by a more recently-issued request. Therefore, if a request stored in Write Request 1 Logic 454 is still pending when the cache hit occurs for the latter request, the latter request must wait until the exclusive ownership is provided for the previous request, and the previous request has been completed. When the request stored in Write Request 1 Logic 454 is completed in the manner discussed above, Control Logic 426 will stage the latter request to Write Request 1 Logic 454, and the write data will be provided on the interface shown as Line 470 to Data RAM Logic for processing. An acknowledge signal issued on Line 436 to Write Buffer Logic 434 will signal that a new request may be staged to Write Request 2 Logic 438 in the manner discussed above.

If a latter request stored in Write Request 2 Logic 438 does not result in a cache hit, or if the requested cache line is not exclusively owned by SCL 360A, Tag RAM Logic 414 indicates the cache miss on Interface 428 to Control Logic 426. Control Logic receives the request from Write Request 2 Logic 438 on Line 440. This request is then forwarded on Line 429 to Interface 385A, is translated into another format by FSB Logic 380A, and is then provided to the Bus 330A to be processed in the manner discussed above. It may be noted that at this time, ownership for the previously-issued request may not yet have been returned to SLC 360A. Thus, two requests for ownership are pending at once.

When multiple requests for ownership are pending at once, ownership may not necessarily be granted in the order the requests were issued. That is, ownership for the request stored in Write Request 2 Logic 438 may be returned prior to that for the previously-received request stored in Write Request 1 Logic 454. This is because the time required to process the request depends on the numbers of levels within the hierarchical memory that must be accessed to process the request. This may vary significantly as discussed above. When ownership is returned for the latter request first, the latter request must not be processed until the ownership associated with the former request has been returned and the request is completed. This is necessary to maintain data consistency, as is discussed above. Therefore, regardless of the order in which ownership is obtained, Control Logic 426 allows the former request to complete in the manner discussed above. Thereafter, Control Logic causes the latter request to be staged into Write Request 1 Logic 454 to be completed while another pending request is transferred to Write Request 2 Logic 438. The completion of this request may entail waiting while ownership is returned. However, in many cases, the ownership will already be available, and the write operation to Data RAM Logic 420 may be completed immediately without delay. According to the preferred embodiment, in some instances in which ownership is obtained for a latter-issued write request before ownership is obtained for an earlier-issued write request, the ownership for that latter request is relinquished before the associated write operation can be completed. This is done to expedite read request processing in certain situations in which two SLCs are requesting access to the same cache line. For example, Bus Snooping Logic 432 of SLC 360A may detect that a read request has been issued on Bus 330A for the same cache line that was requested by the latter-issued write request. Such a read request could either be issued by the SLC 360B, or by the TLC 310, wherein the TLC is responding to a request initiated on Bus 330B, or a request from MSU 110. Since this latter-issued write request that is pending within SLC 360A can not be completed until the earlier-issued write request is processed, and since it is undesirable to delay the SLC that issued the read request until both of the write requests are completed to SLC 360A, the ownership associated with the latter write request is relinquished. After the earlier issued write request has completed, the latter request will be staged to Write Request 2 Logic 438 in SLC 360A in the manner described above. Then a second request will be made to Bus 330A to again obtain ownership of the requested cache line.

Figure 5A:
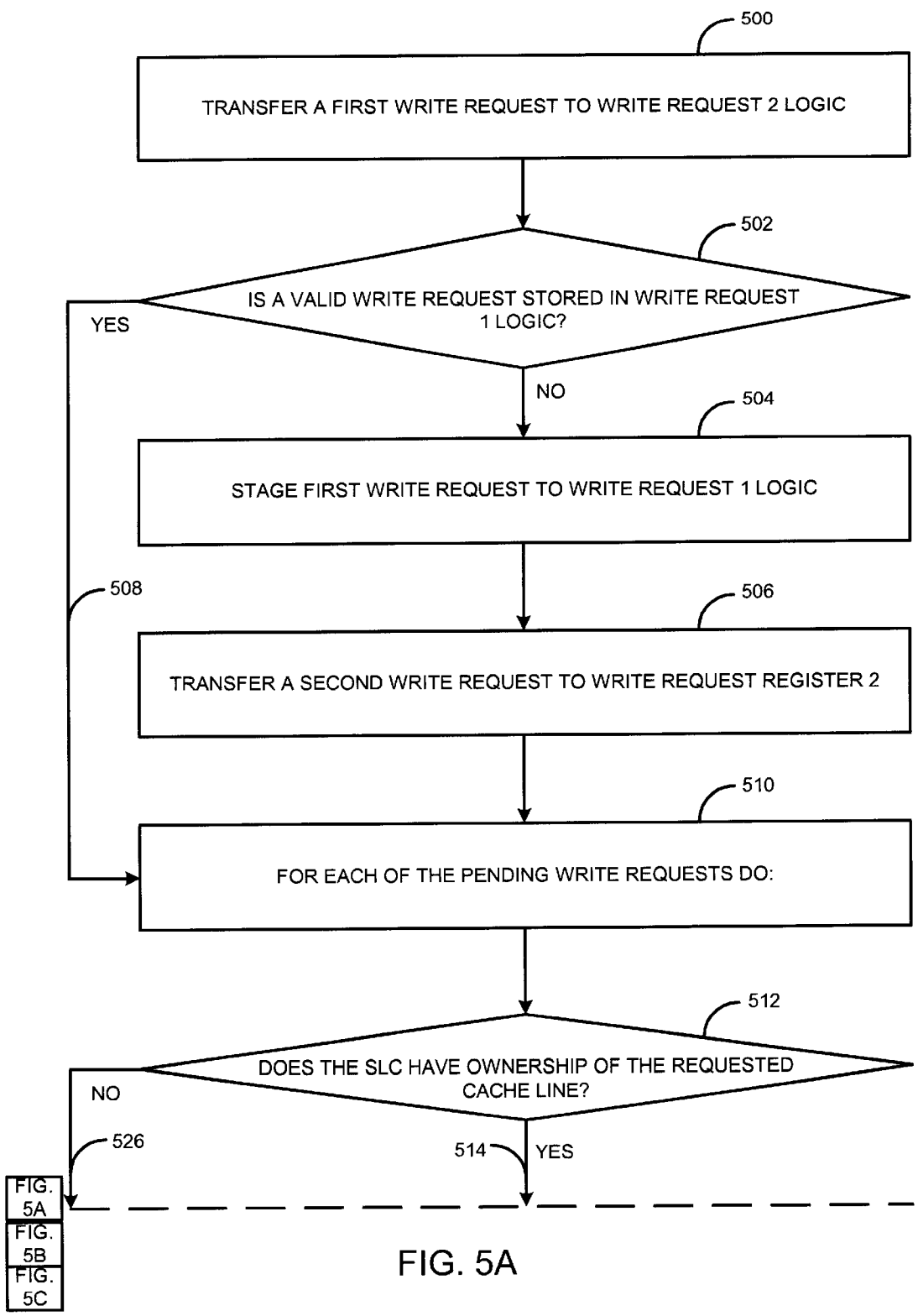
FIGS. 5A, 5B, and 5C, when arranged as shown in FIG. 5, are a flowchart illustrating the manner in which two requests for ownership are processed simultaneously according to the memory coherency scheme of the preferred embodiment.
Figure 5B:
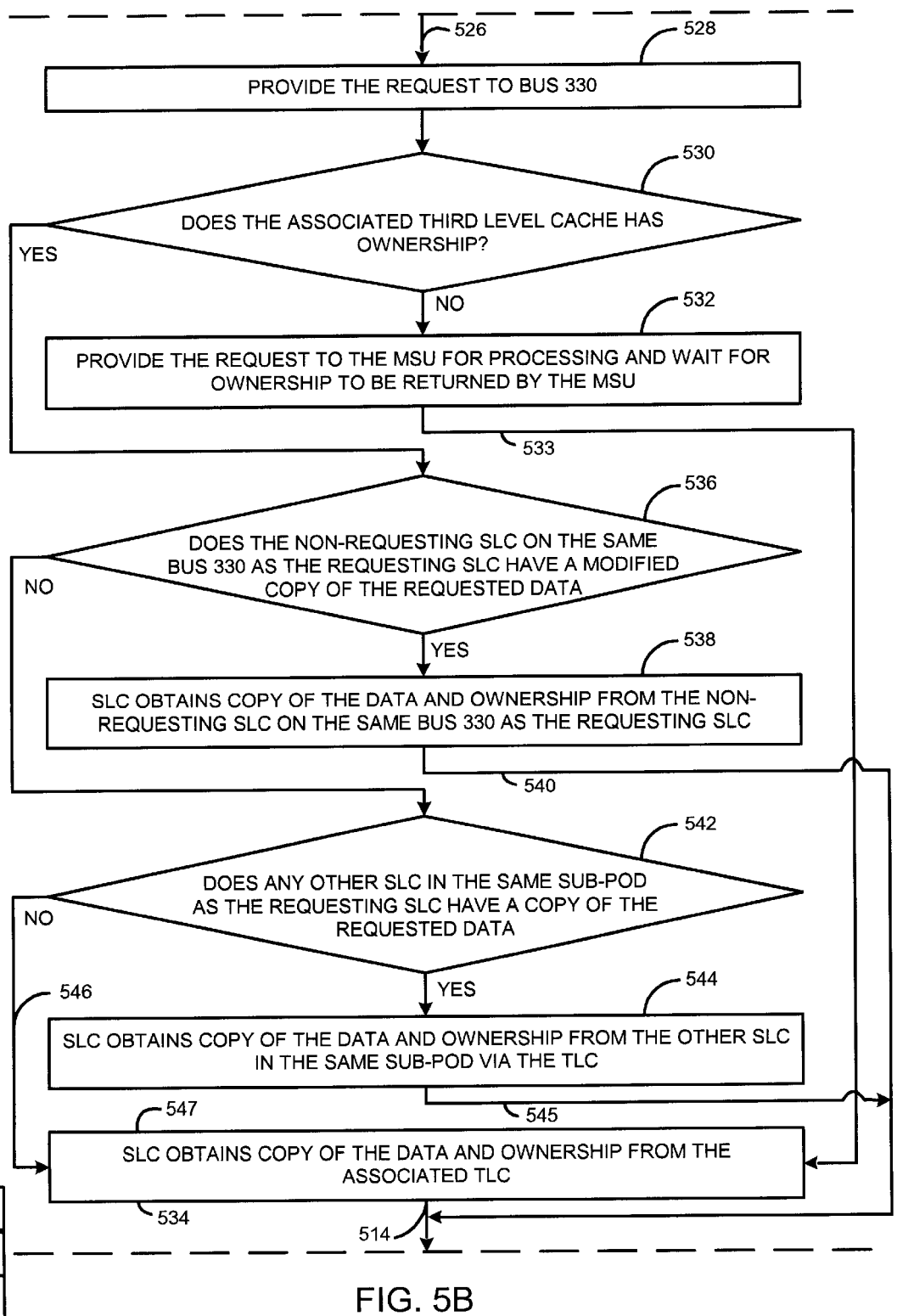
Figure 5C:
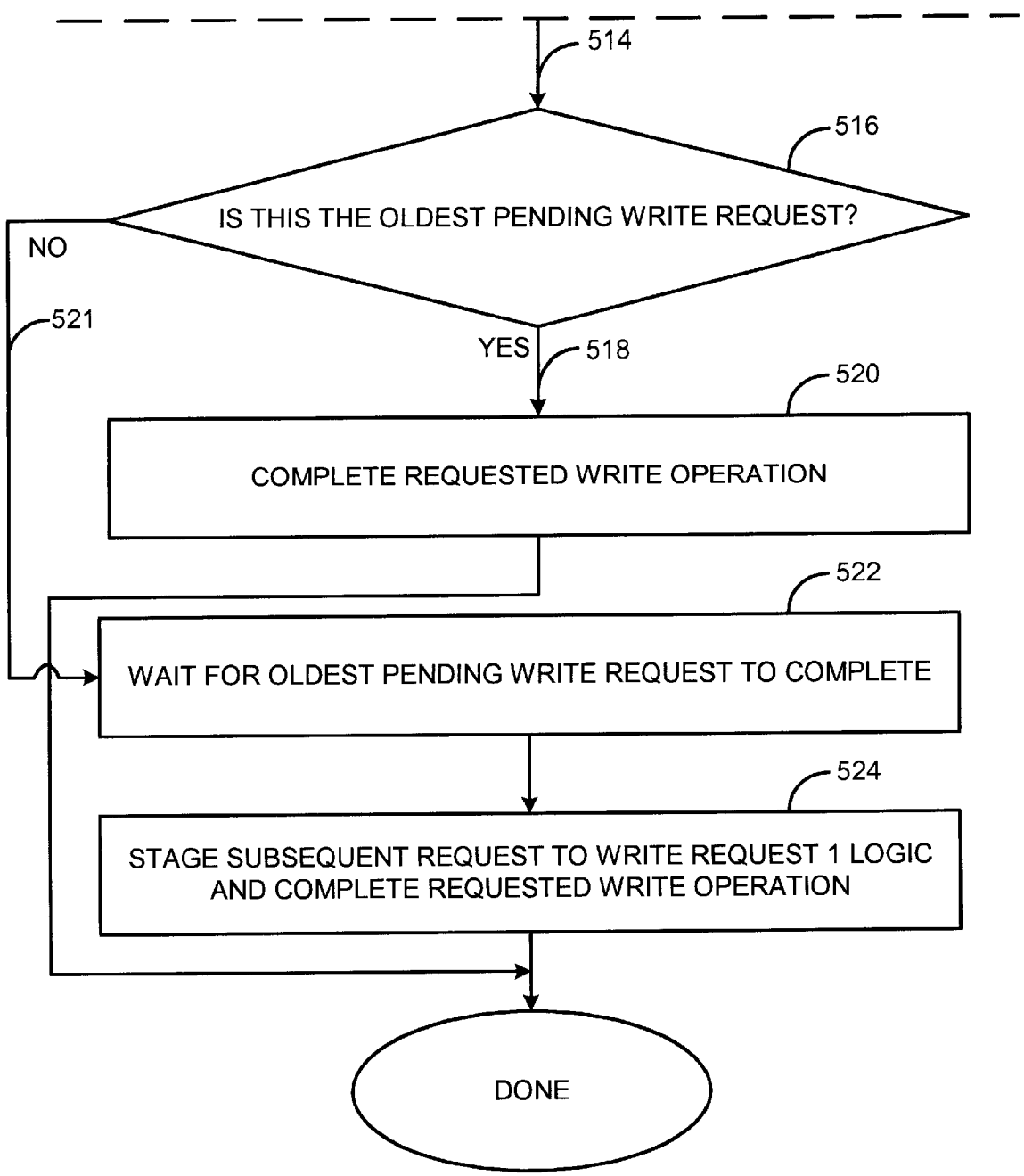

FIGS. 5A, 5B, and 5C, when arranged as shown in FIG. 5, are a flowchart illustrating the manner in which two requests for ownership are processed simultaneously according to the memory coherency scheme of the preferred embodiment. Block 500 illustrates a first request being transferred to Write Request 2 Logic 438. The first request is staged to Write Request 1 Logic 454 if a valid request is not already stored in Write Request 1 Logic, as shown in Decision Block 502 and Block 504. Then a second request is transferred to Write Request 2 Logic 438, as shown in Block 506. If a request was already stored in Write Request 1 Logic 454 when the first request in the flow diagram was received, the first request remains stored in Write Request 2 Logic 438, as shown by Arrow 508.

Next, both of the pending write requests stored in Write Request 1 and Write Request 2 Logic are processed according to the following steps, as indicated by Block 510. If the SLC has ownership of the requested cache line, processing continues to FIG. 5C as indicated by Decision Block 512 and Arrow 514. If this is the older of the two pending requests, the write request is completed, as indicated by Decision Block 516, Arrow 518, and Block 520. Otherwise, this request must remain pending until the oldest request is completed so that data coherency is maintained. After the oldest pending request is completed, this request may be staged to the Write Request 1 Logic, and the write operation may be performed, as indicated by Arrow 521, Blocks 522 and 524, respectively.

Returning to FIG. 5A, if the SLC does not own the requested cache line, processing continues to FIG. 5B as indicating by Arrow 526. The request is provided to Bus 330 as shown by Block 528. If the TLC 310 in the requesting SLC's Sub-POD 210 does not have ownership of the requested cache line, the TLC must obtain ownership from the MSU 110. This is illustrated by Decision Block 530 and Block 532. Then the TLC provides the requested data and ownership to the requesting SLC, as shown by Arrow 533 and Block 534. Processing then continues to FIG. 5C as shown by Arrow 514 to be concluded in the manner discussed above that is required to maintain data coherency.

If the TLC does own the requested cache line, it must be determined whether any other SLC in the Sub-POD has been granted ownership to this requested data. If the SLC on the same Bus 330 as the requesting SLC has been granted ownership to the data and has a modified data copy, the data and ownership are provided by this SLC to the requesting SLC, as illustrated by Decision Block 536 and Block 538. Processing then continues to FIG. 5C to be concluded in the manner discussed above, as shown by Arrows 540 and 514. Otherwise, if an SLC within the same Sub-POD 210 but located on the other Bus 330 from the requesting SLC has ownership of the cache line, ownership and any modified data is returned from this previous owner via the TLC 310 to the requesting SLC. This is shown in Decision Block 542 and Block 544, respectively. Processing then continues to FIG. 5C, as shown by Arrows 545 and 514. Finally, if no other SLC in the Sub-POD has been granted ownership of the requested data, the data and ownership are provided by the TLC 310, as shown by Arrow 546 and Block 547. Then processing continues to FIG. 5C to be concluded in the manner discussed above, as shown by Arrow 514.

The current system increases throughput in several ways. First, two requests for ownership may be pending simultaneously. As stated previously, exclusive ownership may have to be acquired by making a request to the MSU, which in turn, must make a request to another TLC. The time required to process the write requests may therefore be significant. The current invention allows two requests for ownership to be processed at once, so that request-processing time may be at least partially "buried" for one of the two write requests. This can significantly increase throughput. Additionally, the second-level cache design allows read operations to by-pass the write operations so the processing time associated with gaining exclusive ownership does not impact the read requests. This is the case for all read requests except those to cache lines that are associated with write requests. Read operations to cache lines associated with pending write requests may not be performed until the data updates associated with the pending write requests have been recorded in the SLC, as discussed above. Finally, the use of the write buffer allows up to eight requests to be queued before a write request issued by the IP causes the IP to stall. That is, the IP is not required to discontinue processing instructions until the IP makes a write request at a time when eight write requests are already pending in the write buffer, and an additional two requests are pending in the SLC 360A.

It may be noted that a mechanism similar to that provided by the current invention for write requests could likewise be implemented for read requests. That is, a system for providing multiple read requests for cache lines not present in the SLC could be implemented in a manner similar to that shown in FIG. 4 for write requests. However, a design choice was made to exclude this logic for read requests in the preferred embodiment of the current system for several reasons. First, a large percentage of read operations involve instruction fetches. During the execution of a sequence of instructions, instruction execution is often re-directed by the occurrence of a jump, skip, or other such instruction. Obtaining a read copy of a cache line that is subsequently determined to be unneeded because execution re-direction has occurred can waste system resources. Thus, for many read situations, it is considered undesirable to obtain a prefetched copy of the read data. Additionally, since a cache line including a block of instructions should not, in most instances, undergo modification, it will not be exclusively owned by any cache in the system. Thus, even if the MSU does not own a requested cache line, only read access has been provided by the MSU to other caches in the system. As a result, the MSU need not initiate a return operation to fetch ownership and/or updated data, and a request for the cache line may be processed without delay. Thus, a shorter access time is generally associated with many read requests as compared to the time required to complete the average write request, making it less necessary to bury the read access times following a read miss to an SLC 360.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following Claims and their equivalents.

What is claimed is:

1. For use in a data processing system having a main memory to store data items and a processor coupled to make requests to the main memory to read from or to write to selected ones of the data items, wherein the processor must be granted ownership status by the main memory for a requested one of the data items before the processor may write to the requested one of the data items, a memory system, comprising:

first request logic to receive from the processor a first request to write to a first selectable one of the data items stored in the main memory, and in response thereto, to request that ownership status be granted by the main memory for said first selectable one of the data items; and second request logic coupled to said first request logic and to the processor to receive from the processor a second request to write to a second selectable one of the data items stored in the main memory, and in response thereto, and while said first request is still pending to the main memory, to request that ownership status be provided by the main memory for said second selectable one of the data items.

2. The memory system of claim 1, and further including a cache memory coupled to said first request logic to receive said first one of the data items from the main memory, and to perform said first request and said second request after ownership of said first selectable one of the data items and ownership of said second selectable one of the data items have been granted, respectively.

3. The memory system of claim 2, and further including a tag memory coupled to said cache memory to store status data signals to indicate whether ownership of any of the data items stored in the main memory has been granted to the processor.

4. The memory system of claim 3, wherein said first request logic is coupled to said tag memory to determined whether said status data signals indicate ownership has already been granted for said first selectable one of the data items, and if so, to provide said first request directly to said cache memory without first requesting ownership from the main memory.

5. The memory system of claim 4, wherein said second request logic is coupled to said tag memory to determined whether said status data signals indicate ownership has already been granted for said second selectable one of the data items, and if so, to provide said second request directly to said cache memory without first requesting ownership from the main memory.

6. The memory system of claim 2, and further including a control circuit coupled to said first request logic and to said second request logic to ensure all requests issued by the processor to write to ones of the data items stored in the main memory are presented to said cache memory in the order in which said all requests are issued by the processor.

7. The memory system of claim 6, and further including a storage device coupled to said second request logic to receive from the processor, and to temporarily store, multiple pending requests to write to ones of the data items stored in the main memory, said multiple pending requests being temporarily stored if said first request logic and said second request logic already store valid ones of said requests to write to ones of the data items.

8. The memory system of claim 1, and further including read request logic coupled to the processor to receive from the processor a read request to read a selectable one of the data items stored in the main memory, said read request logic to allow said read request to be processed before any pending request to write to a selectable one of the data items stored in the main memory.

9. For use in a data processing system having a main memory and multiple processors coupled to the main memory each to issue requests to read from, and to write to, selectable portions in the main memory, the main memory including a directory memory to store status signals indicating, for each of the selectable portions, whether any respective one of the multiple processors has acquired ownership of the selectable portion such that modifications may be made to the selectable portion by the respective one of the processors acquiring ownership, the data processing system further including write request logic respectively coupled to a selected one of the multiple processors, a method of processing requests provided by said multiple processors to access ones of the selectable portions of the main memory, comprising the steps of:

a.) receiving a first write request issued by the selected one of the multiple processors, said first write request requesting write access to a first one of the selectable portions, said first write request to be stored in the write request logic respectively coupled to said selected one of the multiple processors;

b.) receiving a second write request issued by said selected one of the multiple processors, said second write request requesting write access to a second one of the selectable portions, said second write request to be stored in said write request logic respectively coupled to said selected one of the multiple processors;

c.) issuing a first ownership request from said write request logic respectively coupled to said selected one of the multiple processors, said first ownership request being issued to the main memory to obtain ownership for said first one of the selectable portions; and d.) issuing a second ownership request from said write request logic respectively coupled to said selected one of the multiple processors, said second ownership request being issued to the main memory to obtain ownership for said second one of the selectable portions while said first ownership request is still pending to the main memory.

10. The method of claim 9, wherein the data processing system further includes write request logic respectively coupled to multiple selected ones of the multiple processors, and further including the step of:

e.) performing steps a.)–d.) by each of said multiple selected ones of the multiple processors in the data processing system at the same time.

11. The method of claim 9, wherein the data processing system further includes a cache memory coupled to the selected one of the multiple processors, and further including the steps of:

e.) receiving ownership from the main memory for said first one of the selectable portions;

f.) completing said first write request to the cache memory for said first one of the selectable portions; and g.) repeating steps a.) and c.) for another write request issued by the selected one of the multiple processors.

12. The method of claim 11, and further including the steps of:

h.) receiving ownership from the main memory for said second one of the selectable portions after ownership is received for said first one of the selectable portions;

i.) completing said second write request to the cache memory for said second one of the selectable portions; and j.) repeating steps b.) and d.) for another write request issued by the selected one of the multiple processors.

13. The method of claim 11, and further including the steps of:

h.) receiving ownership from the main memory for said second one of the selectable portions before ownership is received for said first one of the selectable portions;

i.) waiting until ownership is received from the main memory for said first one of the selectable portions;

j.) completing the write request to the cache memory for said first one of the selectable portions;

k.) completing the write request to the cache memory for said second one of the selectable portions after completing the write request to the cache memory for said first one of the selectable portions; and l.) repeating steps a.)–d.) for two additional write requests issued by the selected one of the multiple processors.

14. The method of claim 12, wherein the data processing system includes a storage device respectively coupled to the selected one of the multiple processors, and further including the steps of:

storing any of said write requests received from the selected one of the multiple processors in the respectively coupled storage device if the write request logic has already stored said first and said second write requests;

providing ones of the requests stored during said storing step to said write request logic during said steps a.) and b.) after processing has completed for said first and said second write requests.

15. The method of claim 12, wherein the data processing system includes read request logic coupled to said selected one of the multiple processors, and further including the steps of:

receiving a read request issued by the selected one of the multiple processors requesting read access to one of the selectable portions, said read request being issued after said first write request and said second write request were issued; and allowing said read request to be processed prior to completing either of said first write request or said second write request.

16. The method of claim 12, wherein the data processing system further includes a tag memory coupled to the cache memory to record, for each selectable portion of the main memory, whether ownership has already been granted to said selected one of the processors, and further including the steps of:

reading the tag memory to determine whether ownership for said first selectable portion of the main memory has already been granted to said selected one of the processors; and skipping steps c.) and e.) if ownership for said first selectable portion of the main memory has already been granted to the selected one of the processors.

17. The method of claim 16, and further including the steps of:

reading the tag memory to determine whether ownership for said second selectable portion of the main memory has already been granted to said selected one of the processors; and skipping steps d.) and h.) if ownership for said second selectable portion of the main memory has already been granted to the selected one of the processors.

18. For use in a data processing system having a main memory to store data items and multiple processors coupled to make requests to the main memory to access ones of the data items, wherein any of the multiple processors must be granted ownership status before a predetermined type of the requests to the main memory may be completed, a system for handling memory requests, comprising:

first request means for receiving from each of the multiple processors a respective first request of the predetermined type each requesting access to a respective first one of the data items, and for presenting each of said respective first requests to the main memory to gain ownership of each said respective first one of the data items if the respective requesting one of the multiple processors has not already obtained ownership status from the main memory; and second request means for receiving from each of the multiple processors a respective second request of the predetermined type each requesting access to a respective second one of the data items, and for presenting each of said respective second requests to the main memory to gain ownership of each said respective second one of the data items if the respective requesting one of the multiple processors has not already obtained ownership status from the main memory, said second requests to be presented to the main memory while said first requests are still pending to the main memory.

19. The system of claim 18, and further comprising cache means coupled to each of the multiple processors for temporarily storing ones of the data items retrieved from the main memory, and for processing each of said first requests after ownership for each of said respective first ones of the data items is obtained from the main memory, and for processing each of said second requests after ownership for said respective second ones of the data items is obtained from the main memory.

20. The system of claim 19, and further comprising control means coupled to said first request means and to said second request means for ensuring that multiple requests issued by any same one of the multiple processors are processed by said cache means in time-order regardless of the order in which ownership is granted by the main memory.

* * * * *